US012497822B2

(12) United States Patent

Gladysz-Haller et al.

(10) Patent No.: US 12,497,822 B2

(45) Date of Patent: Dec. 16, 2025

(54) GATEFRAME FASTENING FOR A FOLDING GATE

(71) Applicant: Schneider Torsysteme Gesellschaft m.b.H, Buchkirchen (AT)

(72) Inventors: Bettina Gladysz-Haller, Wels (AT); Madeleine Heidlmayer, Bad Hall (AT); Siegfried Kreilmeier, Fraham (AT); Martin Mairhuber, Gallspach (AT); Bernhard Pichler, St. Florian (AT); Martin Schneider, Wels (AT); Gottfried Spitzl, Katsdorf (AT)

( * ) Notice: Subject to any disclaimer, the term of this patent is extended or adjusted under 35 U.S.C. 154(b) by 229 days.

(21) Appl. No.: 18/024,476

(22) PCT Filed: Aug. 9, 2021

(86) PCT No.: PCT/AT2021/060277

§ 371 (c)(1),
(2) Date: Mar. 2, 2023

(87) PCT Pub. No.: WO2022/047510

PCT Pub. Date: Mar. 10, 2022

(65) Prior Publication Data

US 2024/0026727 A1 Jan. 25, 2024

(30) Foreign Application Priority Data

Sep. 2, 2020 (AT) ................................ A50746/2020

(51) Int. Cl.
*E06B 3/263* (2006.01)
*E06B 3/48* (2006.01)

(52) U.S. Cl.
CPC ................ *E06B 3/263* (2013.01); *E06B 3/48* (2013.01)

(58) Field of Classification Search
CPC ........ E06B 3/263; E06B 3/48; E06B 3/26301; E06B 3/26303; E06B 3/34; E06B 3/36;
(Continued)

(56) References Cited

U.S. PATENT DOCUMENTS 4,495,726 A * 1/1985 Lindstrom .......... E06B 3/26301 49/501
4,614,062 A * 9/1986 Sperr ...................... E06B 7/231 49/504

(Continued)

FOREIGN PATENT DOCUMENTS

AT 411380 B 12/2003
DE 9105952 U1 8/1991

(Continued)

OTHER PUBLICATIONS

Espacenet English language abstract for KR101726717, Apr. 13, 2017.

*Primary Examiner* — Kyle J. Walraed-Sullivan
(74) *Attorney, Agent, or Firm* — Tiajoloff & Kelly LLP

(57) ABSTRACT

A doorframe fastening for a folding door comprises a doorframe profiled section (1), which has a securing limb (2) and a door leaf suspension (3). The doorframe fastening reliably withstands high weight loads and reduces noise emission but still allows a long-term use while avoiding cold bridges and damage from corrosion. An inner support limb (7) protrudes from the securing limb (2), said inner support limb being connected to an outer support limb (9) via a thermally insulating separating web (8), and the door leaf suspension (3) is supported both on the inner (7) as well as on the outer support limb (9).

21 Claims, 2 Drawing Sheets

Figure 1:
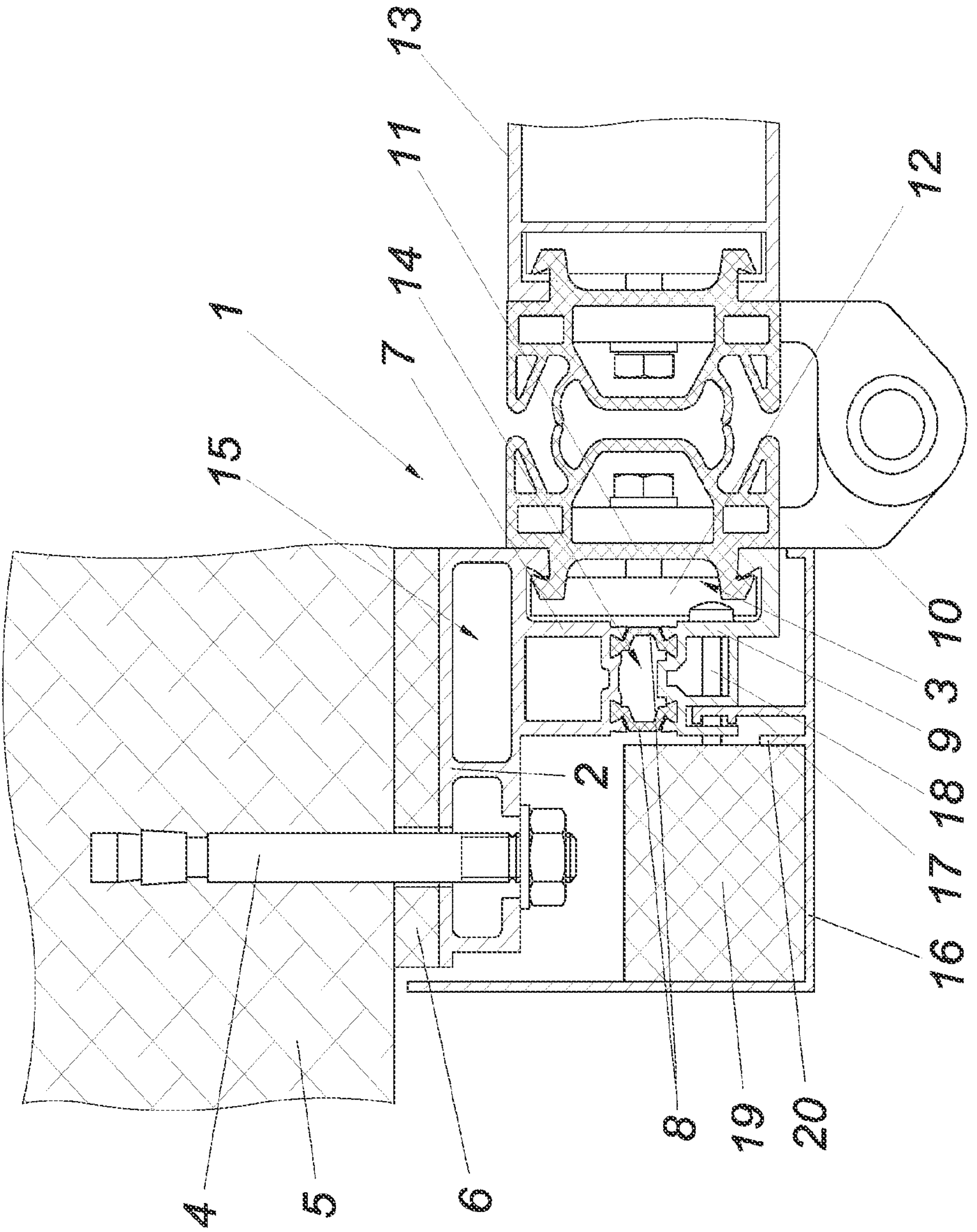

(58) Field of Classification Search
CPC .......... E06B 3/362; E06B 1/60; E06B 1/6038; E06B 1/6053; E05D 15/26
See application file for complete search history.

(56) References Cited

U.S. PATENT DOCUMENTS

| | | | | |
|---|---|---|---|---|
| 6,035,600 | A * | 3/2000 | Habicht | E06B 3/26305 52/656.5 |
| 9,328,549 | B1 * | 5/2016 | Alexander | E06B 1/325 |
| 9,441,412 | B1 * | 9/2016 | Hooper, Jr. | E06B 3/5821 |
| 10,233,689 | B1 * | 3/2019 | Jones | E06B 3/962 |
| 11,035,169 | B1 * | 6/2021 | Wermers | E06B 3/36 |
| 11,346,148 | B1 * | 5/2022 | Mazur | E06B 3/26303 |
| 2010/0018140 | A1 * | 1/2010 | Brunnhofer | E06B 3/26303 52/717.05 |
| 2011/0011028 | A1 * | 1/2011 | Rawlings | E06B 3/263 52/656.5 |
| 2013/0081332 | A1 * | 4/2013 | Baumert | E06B 1/52 49/397 |
| 2016/0312519 | A1 * | 10/2016 | Blijweert | E06B 1/16 |
| 2018/0163458 | A1 * | 6/2018 | Header | E06B 3/362 |
| 2018/0179805 | A1 * | 6/2018 | Niehausmeier | E05C 1/00 |
| 2018/0216397 | A1 * | 8/2018 | Chen | E06B 9/52 |
| 2018/0320433 | A1 * | 11/2018 | Ting | E06B 3/64 |
| 2019/0055773 | A1 * | 2/2019 | Brandes | E06B 3/26305 |
| 2019/0226269 | A1 * | 7/2019 | Tenzon | E05D 5/02 |
| 2020/0109595 | A1 * | 4/2020 | Woodward | E06B 3/6715 |
| 2020/0263463 | A1 * | 8/2020 | Woodward | E06B 9/52 |
| 2021/0207426 | A1 * | 7/2021 | Fielding | E06B 3/5821 |
| 2021/0324675 | A1 * | 10/2021 | Liang | E06B 7/2309 |
| 2021/0396069 | A1 * | 12/2021 | Vansickle | E06B 3/26 |
| 2022/0136296 | A1 * | 5/2022 | Woodward | E05D 5/12 16/221 |
| 2022/0389757 | A1 * | 12/2022 | Glover | E06B 7/16 |
| 2023/0167670 | A1 * | 6/2023 | Joossen | E06B 3/4609 49/425 |
| 2023/0287731 | A1 * | 9/2023 | Brás | E06B 3/56 |

FOREIGN PATENT DOCUMENTS

| | | | | |
|---|---|---|---|---|
| DE | 102013108528 | A1 | 2/2015 | |
| EP | 0401180 | A1 | 12/1990 | |
| EP | 733765 | A1 * | 9/1996 | E06B 3/26303 |
| EP | 1327739 | A2 * | 7/2003 | E06B 3/26303 |
| KR | 101726717 | B1 | 4/2017 | |

* cited by examiner

GATEFRAME FASTENING FOR A FOLDING GATE

FIELD OF THE INVENTION

The invention relates to a gateframe fastening for a folding gate, comprising a gateframe profile having a fastening limb and a gate leaf suspension.

DESCRIPTION OF THE PRIOR ART

In order to reliably fasten multi-leaf folding gates in particular, whose total leaf weight can regularly exceed 1.5 t, in or on gate reveals, gateframe fastenings with gateframe profiles are known, which have a fastening limb and a gate leaf suspension. The gate leaf suspension can be used to hold hinge hinges, which in turn are connected to a gate leaf of the folding gate. In contrast, the fastening limb is designed to fasten the gateframe profile directly to the reveal, for example, using anchor bolts or mounting brackets, depending on the installation situation. Such gateframe fastenings are designed to reliably absorb not only the high weight load of the folding gate but also additional superimposed loads, e.g. surface loads acting on the folding gate due to strong winds, without causing damage to the gateframe fastening. In view of this, the gateframe profiles are regularly designed as aluminum profiles, since these not only have the specific strength required for such purposes, but also permit long-term use without causing material fatigue or weather damage. However, a major disadvantage of the known gateframe fastenings is that the aluminum profiles form cold bridges in practice due to their very good thermal conductivity of 200 W/(m*K). This not only leads to poor thermal insulation properties, but also promotes undesirable condensation, which in the long term causes corrosion damage to any components, especially the screw connections. In addition, known aluminum profiles introduce vibrations that occur during opening and closing of the folding gates undamped via the fastening means into the gateframe, so that the fastening means are additionally stressed and increased noise emission occurs.

SUMMARY OF THE INVENTION

The invention is thus based on the object of creating a gateframe fastening of the type described above that reliably withstands high weight loads, reduces noise emissions and yet allows long-term use while avoiding cold bridges and corrosion damage.

The invention solves the set object in that an inner support limb protrudes from the fastening limb and is connected to an outer support limb via a thermally insulating separating web, and in that the gate leaf suspension is supported both on the inner as well as on the outer support limb.

The fact that the gate leaf suspension is supported on both the inner and outer support limbs, so that only partial loads are applied to each of the two limbs, means that the weight and additional forces introduced into the gateframe profile via the gate leaf suspension can be evenly transferred. This measure creates the prerequisite that, for thermal decoupling between the inner and outer support limbs, materials can be used as the separating web which themselves have only low strength but are characterized by particularly good thermal insulating properties, in particular a thermal conductivity of at most 0.3 W/(m*K). To enable particularly effective thermal decoupling to avoid a cold bridge in the gateframe profile, it is advisable to select the dimensions of the separating web so that the heat transfer coefficient of the gateframe fastening is at most 3 W/($m^2$*K), preferably at most 2.8 W/($m^2$*K). Furthermore, with the appropriate choice of material, especially when polyamide is used as the separating web material, particularly favorable vibration-damping properties can be achieved in addition to thermal decoupling, so that not only are vibrations that reduce the fatigue strength of the gateframe profile reduced, but also undesirable sound propagation in the masonry is largely avoided. The gateframe fastening according to the invention can be used without any problems in various installation situations, in particular for a fastening in front of, behind or in the reveal. For installation in front of or behind the reveal, the fastening limb can be fastened directly to the masonry using, for example, an anchor screw. For installation in the reveal, mounting brackets can be used which are screwed to the fastening limb at one end and are connected to the masonry at their other end, e.g. via an anchor screw.

In order to further compensate for the material weakening introduced by the thermally insulating separator, the inner and outer support limbs can be connected to each other in a form-fitting and/or a force-fitting manner via the gate leaf suspension. In this way, not only are the bearing forces introduced into the inner and outer support limbs, but the inner and outer support limbs are also connected to each other so that both form a structural unit both via the separating web and via the gate leaf suspension.

The thermally insulating and sound-insulating or vibration-damping properties of the gateframe fastening can be further improved if the inner and outer support limbs are connected via two thermally insulating separating webs which, together with the inner and outer support limbs, delimit a separating chamber. The separating chamber is preferably designed as an air chamber and thus serves as an additional insulating body in the gateframe profile. Particularly favorable properties, in particular a heat transfer coefficient of less than 2.8 W/($m^2$*K), can be achieved, for example, if the separation chamber width has an aspect ratio of approximately 1:3 to 1:5 to the gateframe profile width and the separation chamber depth has an aspect ratio of approximately 1:4 to 1:6 to the gateframe profile width, and/or the length of the inner support limb extending in the direction of the gateframe profile depth and the length of the outer support limb have an aspect ratio of approximately 1:1. In this context, it is also advantageous if, as viewed in cross-section, the distance from the center of gravity of the separating chamber to the outer profile edge of the outer support limb and the distance from the center of gravity of the separating chamber to the outer profile edge of the fastening limb have a length ratio of approximately 1:1.5.

In order not only to reduce manufacturing costs but also to simplify handling during assembly, despite an increase in both thermal insulation and sound insulation properties, the fastening limb can form a hollow profile chamber to which the inner support limb is attached. Due to the provision of a hollow profile chamber attached to the inner support limb, the weight of the gateframe profile can be reduced without noticeably reducing the overall strength of the gateframe profile. In addition, the hollow profile chamber, which forms an air chamber, for example, acts as an additional insulating body. The fact that the hollow profile chamber saves material and also reduces the dead weight of the gateframe fastening means that production costs can be saved and simplified assembly conditions can be achieved.

In order to enable both an attractive appearance while retaining all the advantages of the invention and to protect any screw connections of the fastening limb to the reveal from the effects of the weather, the outer support limb can have a cover receptacle for a retaining limb of a cover profile covering the fastening limb, the inner support limb and the outer support limb. Different cover profiles can be provided depending on whether the fastening limb is fastened to the gateframe via a fastening anchor or a mounting bracket. For example, when the fastening limb is mounted via a fastening anchor, a cover profile with an essentially L-shaped cross-section can preferably be used.

Particularly favorable design conditions arise in this context if the retaining limb of the cover profile can be fixed via a clamping part that can be inserted into the cover receptacle from the side of the gate leaf suspension. In particular, this facilitates assembly and subsequent replacement of the cover profile on the gateframe profile. The clamping part can, for example, be designed as a clamping bolt or the like, which at least partially penetrates the cover receptacle and the retaining limb inserted into the cover receptacle for a clamping connection. Alternatively, the clamping part may form a screw.

If the cover profile is also designed as a metal profile, in particular an aluminum profile, for reasons of a particularly uniform appearance, this profile can emit undesirable radiant heat caused by solar radiation to the masonry or, conversely, dissipate heat due to any heat radiation from the masonry, which in turn considerably reduces the thermal insulation properties of the gateframe fastening according to the invention. Against this background, it is proposed that the cover profile has a clamping projection projecting in the direction of the gateframe profile for an insulating body arranged between the cover profile and the gateframe profile. The insulating body thus forms an insulation between the cover profile and the gateframe profile. The fact that the cover profile forms corresponding clamping projections results in particularly simple installation conditions, because only suitably cut semi-finished products, for example foam-based semi-finished products, can be provided as insulating bodies. In order to further improve the vibration or sound insulation, the insulating body can have air chambers which can, for example, be milled into the insulating body in a simple manner.

BRIEF DESCRIPTION OF THE INVENTION

Figure 2:
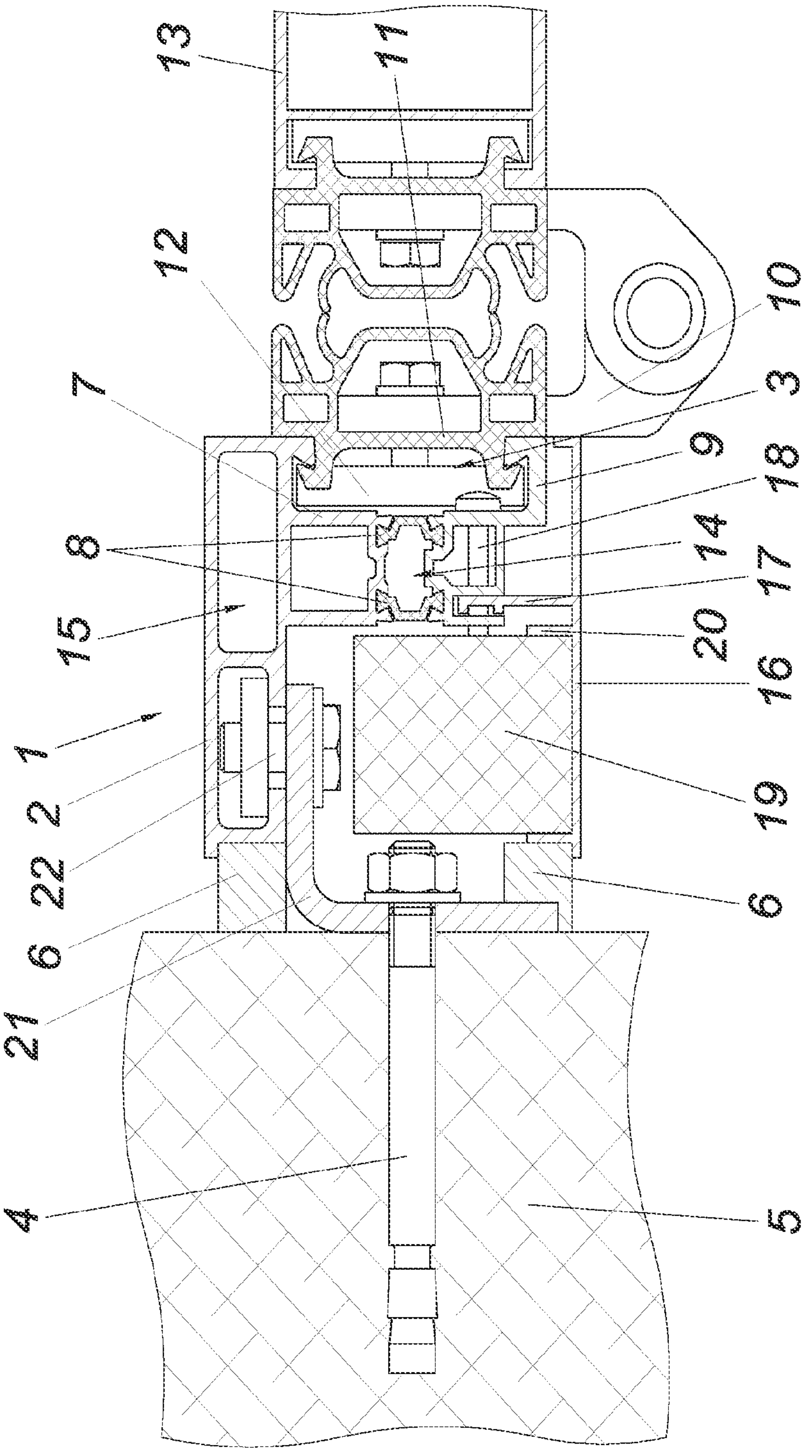

The subject matter of the invention is shown in the drawings by way of example, wherein:

FIG. 1 shows a schematic sectional view of a gateframe fastening according to the invention when mounted in front of the reveal and FIG. 2 shows an illustration corresponding to FIG. 1 for installation in the reveal.

DETAILED DESCRIPTION OF THE PREFERRED EMBODIMENTS

A gateframe fastening according to the invention comprises a gateframe profile 1, which has a fastening limb 2 and a gate leaf suspension 3. According to FIG. 1, the fastening limb 2 is connected to the masonry 5 via an anchor screw 4. In general, an additional insulating carpet pad 6, preferably rubber-based, may also be provided. The insulating carpet pad 6 can be arranged between the fastening limb 2 and the masonry 5, compensates for any unevenness of the masonry 5 and also improves the thermally insulating as well as the sound-absorbing properties of the gateframe fastening.

An inner support limb 7 protrudes from the fastening limb 2 and is connected to an outer support limb 9 via two thermally insulating separating webs 8. The gate leaf suspension 3 is supported both on the inner support limb 7 and on the outer support limb 9 so that the weight or additional forces introduced into the gateframe profile 1 via the gate leaf suspension 3 can be uniformly transferred. In the present exemplary embodiment, the gate leaf suspension 3 comprises a hinge strip 10 and a sealing profile 11, which are jointly connected to the gateframe profile 1 via fastening clamping plates 12 supported both on the inner support limb 7 and on the outer support limb 9. The sealing profile 11 can also be designed in such a way that it engages behind any undercuts of the gateframe profile 1 as additional securing means, so that the gate leaf suspension 3, the inner support limb 7 and the outer support limb 9 are positively and/or non-positively connected to one another. On the side opposite the gateframe profile 1, the hinge strip 10 together with the sealing profile 11 is attached to a corresponding folding gate leaf 13.

In view of the particularly advantageous thermal insulation, sound insulation and vibration damping properties of the gateframe fastening, the separating webs 8 together with the inner support limb 7 and the outer support limb 9 define a separating chamber 14. In addition, the fastening limb 2 forms a hollow profile chamber 15 to which the inner support limb 7 is attached.

A cover profile 16 can be provided to visually cover the fastening limb 2, the inner support limb 7 and the outer support limb 9, which, according to FIG. 1, for example, has a substantially L-shaped cross-section. The cover profile 16 has a retaining limb 17 for insertion into a cover receptacle of the outer support limb 9. The retaining limb 17 is fixed via a clamping part 18, for example a clamping bolt or a screw, inserted into the cover receptacle from the side of the gate leaf suspension 3.

In addition, an insulating body 19, for example based on polystyrene, is provided, which forms an insulation lying between the cover profile 16 and the gateframe profile 1. For fastening the insulating body 19, the cover profile 16 can have at least one clamping projection 20 projecting in the direction of the gateframe profile 1.

FIG. 2 shows an alternative embodiment of a gateframe fastening according to the invention, wherein the installation is carried out in a reveal. In this case, for example, a flexurally rigid mounting bracket is provided, which is connected at one end to the fastening limb 2 via a screw connection 21 and at the other end to the masonry 5 via an anchor screw 4. In accordance with the embodiment shown in FIG. 2, the insulating carpet pad 6 can be designed as an insulating strip, wherein one insulating strip is arranged between the masonry 5 and the fastening limb and a second insulating strip is arranged between the masonry 5 and the cover profile 16.

The invention claimed is:

1. A gateframe fastening for a folding gate, said gateframe fastening comprising:

a gateframe profile having a fastening limb and a gate leaf suspension supporting a gate leaf for turning movement thereon;

wherein an inner support limb protrudes from the fastening limb and is connected to an outer support limb via a thermally insulating separating web; and wherein the gate leaf suspension is fixedly connected with the inner support limb and the outer support limb such that loads from the gate leaf suspension that support the gate leaf are partially applied to both the inner support limb and the outer support limb.

2. The gateframe fastening according to claim 1, wherein the inner support limb and outer support limb are held connected to one another by the gate leaf suspension.

3. The gateframe fastening according to claim 2, wherein the inner support limb and outer support limb are connected via two thermally insulating separating webs that, together with the inner support limb and outer support limb, delimit a separating chamber.

4. The gateframe fastening according to claim 3, wherein the fastening limb forms a hollow profile chamber to which the inner support limb is attached.

5. The gateframe fastening according to claim 2, wherein the fastening limb forms a hollow profile chamber to which the inner support limb is attached.

6. The gateframe fastening according to claim 2, wherein the outer support limb has a cover receptacle receiving a retaining limb of a cover profile covering the fastening limb, the inner support limb and the outer support limb.

7. The gateframe fastening according to claim 6, wherein the retaining limb of the cover profile is fixed via a clamping part extending into the cover receptacle from a side of the gate leaf suspension.

8. The gateframe fastening according to claim 7, wherein the cover profile has a clamping projection projecting in the direction of the gateframe profile and securing an insulating body arranged between the cover profile and the gateframe profile.

9. The gateframe fastening according to claim 1, wherein the inner support limb and outer support limb are connected via two thermally insulating separating webs that, together with the inner support limb and outer support limb, delimit a separating chamber.

10. The gateframe fastening according to claim 9, wherein the fastening limb forms a hollow profile chamber to which the inner support limb is attached.

11. The gateframe fastening according to claim 9, wherein the outer support limb has a cover receptacle receiving a retaining limb of a cover profile covering the fastening limb, the inner support limb and the outer support limb.

12. The gateframe fastening according to claim 11, wherein the retaining limb of the cover profile is fixed via a clamping part extending into the cover receptacle from a side of the gate leaf suspension.

13. The gateframe fastening according to claim 12, wherein the cover profile has a clamping projection projecting in the direction of the gateframe profile and securing an insulating body arranged between the cover profile and the gateframe profile.

14. The gateframe fastening according to claim 1, wherein the fastening limb forms a hollow profile chamber to which the inner support limb is attached.

15. The gateframe fastening according to claim 14, wherein the outer support limb has a cover receptacle receiving a retaining limb of a cover profile covering the fastening limb, the inner support limb and the outer support limb.

16. The gateframe fastening according to claim 15, wherein the retaining limb of the cover profile is fixed via a clamping part extending into the cover receptacle from a side of the gate leaf suspension.

17. The gateframe fastening according to claim 1, wherein the outer support limb has a cover receptacle receiving a retaining limb of a cover profile covering the fastening limb, the inner support limb and the outer support limb.

18. The gateframe fastening according to claim 17, wherein the retaining limb of the cover profile is fixed via a clamping part extending into the cover receptacle from a side of the gate leaf suspension.

19. The gateframe fastening according to claim 1, wherein the gate leaf suspension includes a hinge supporting the gate leaf in said turning movement and transmitting loads from the gate leaf via the gate leaf suspension to the inner support limb and the outer support limb.

20. The gateframe fastening according to claim 17, wherein the cover profile has a clamping projection projecting in the direction of the gateframe profile and securing an insulating body arranged between the cover profile and the gateframe profile.

21. The gateframe fastening according to claim 18, wherein the cover profile has a clamping projection projecting in the direction of the gateframe profile and securing an insulating body arranged between the cover profile and the gateframe profile.

* * * * *